June 29, 1965 I. W. SANDBERG 3,192,402
DELAY NETWORK
Filed March 9, 1961
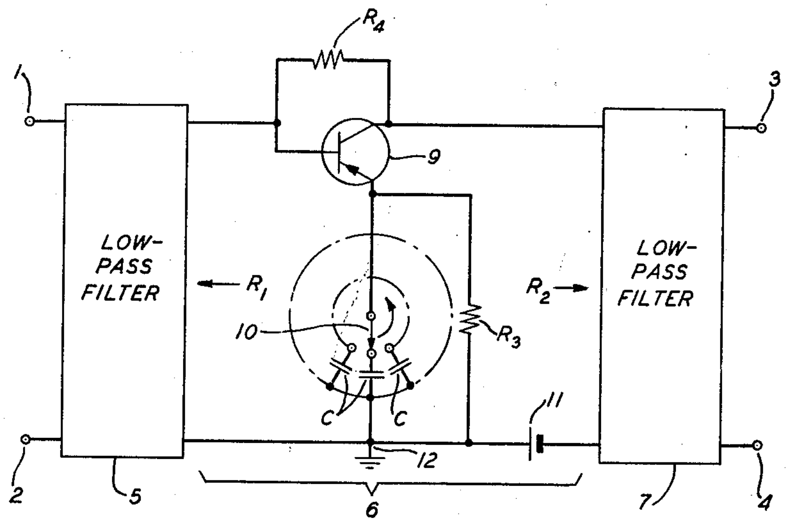
INVENTOR
I. W. SANDBERG
BY Ralph T. Holcomb
ATTORNEY

United States Patent Office 3,192,402
Patented June 29, 1965

3,192,402
DELAY NETWORK

Irwin W. Sandberg, Springfield, N.J., assignor to Bell Telephone Laboratories, Incorporated, New York, N.Y., a corporation of New York Filed Mar. 9, 1961, Ser. No. 94,474
4 Claims. (Cl. 307—88.5)

This invention relates to wave transmission networks and more particularly to an active delay network of the sampled-data type.

The object of the invention is to delay an electrical signal by a time which is constant with frequency, without introducing amplitude distortion. A further object is to reduce the complexity, size, and cost of a delay network.

An active delay network of the sampled-data type comprising switched capacitors have received substantial previous consideration in the art. For background information concerning their general construction and application and analysis of the technical and mathematical principles upon which they are based, reference may be had to an article by B. D. Smith entitled "Analysis of Commutated Networks," I.R.E. Transactions, PGAE–10, December 1953, page 21; an article by the present inventor and another entitled, "An Alternative Approach to the Realization of Network Transfer Functions: the N-Path Filter," in the Bell System Technical Journal, volume 39, September 1960, page 1321; or the copending application of L. E. Franks and others, now Patent 2,981,892, April 25, 1961. As pointed out in any of these references, the network offers certain advantages when the product of delay times band width is large. The network of the present invention is of this type, but its circuit is simpler than those heretofore known for the purpose. Specifically, the present invention is directed to a specific circuit simplification of the circuit described in the aforementioned copending application by means of which a single transistor becomes the only active element of the network, and no component amplifiers, attenuators, or combining networks are required. Thus, the complexity, size, and cost are reduced.

The nature of the invention and its various objects, features, and advantages will apepar more fully in the following detailed description of a typical embodiment illustrated in the accompanying drawing, the single figure of which is a schematic circuit of an active delay network of the switched type in accordance with the invention.

As shown, the network has a pair of input terminals 1–2, to which a source of signals may be connected, and a pair of output terminals 3–4, to which a suitable load may be connected. The network comprises an input filter 5, an output filter 7, and an interposed active network 6. The active network 6 comprises a transistor 9 as the active element, two resistors, N capacitors each of capacitance C, a switch 10, and a battery or other source of voltage 11.

The base of the transistor 9 is connected through the filter 5 to an input terminal 1. The collector is connected through the filter 7 to an output terminal 3. Two impedance paths are connected in parallel between the emitter and the ground terminal 12. One of these paths includes a biasing resistor of value $R_3$. The other path includes the capacitors, which are connected into circuit sequentially and repetitively by the rotating switch 10 which rotates one revolution at a uniform speed in a period T. It is assumed that switch 10 contacts the next capacitor C just as it releases the preceding one. Therefore, the dwell time D on each capacitor is $T/N$. The capacitors and the switch thus provide a one-port impedance which varies with time. The other resistor, of value $R_4$, is connected between the base and the collector of the transistor 9 to provide a feedback path. The battery 11 is connected between the ground 12 and the output filter 7. A conductive path is provided from the battery 11 to the collector, either through the filter 7 or through the load which may be connected to the output terminals 3–4. The minimum number N of capacitors is three, and usually more are used. The value of $R_3$ is not critical but is generally chosen to be considerably larger than $R_4$.

The function of the filters 5 and 7 is to limit the input and output to frequencies below $N/2T$. Therefore, these may be low-pass filters with cut-off at $N/2T$. If the input signal at the terminals 1–2 contains no frequencies above $N/2T$, the input filter 5 may be omitted. The filter 5 has a resistive output impedance $R_1$ and the filter 7 has a resistive input impedance $R_2$. The network 6 is adapted to operate between these impedances.

If it is assumed that the emitter-to-collector current-amplification factor of the transistor 9 is unity, the emitter resistance is very much smaller than $D/2C$, and D is approximately equal to $T/N$, it can be shown that the over-all network will have a constant delay equal to T at all frequencies below $N/2T$, without introducing amplitude distortion, if $$R_4 = D/2C \tag{1}$$

and $$R_2 = R_4\left[\frac{R_1 + R_4}{R_1 - R_4}\right] \tag{2}$$

It is to be understood that the above-described arrangement is only illustrative of the application of the principles of the invention. Numerous other arrangements may be devised by those skilled in the art without departing from the spirit and scope of the invention.

What is claimed is:

1. A delay network having an input terminal, an output terminal, and a ground terminal and comprising a transistor having a base, a collector, and an emitter, a path from the base to the input terminal, a path from the collector to the output terminal, a resistor of value $R_4$ connected between the base and the collector, and two impedance paths connected in parallel between the emitter and the ground terminal, one of the parallel paths including a biasing resistor and the other parallel path including N capacitors, each of value C, and means for connecting the capacitors into circuit sequentially and repetitively in a period of time T with a dwell time D for each capacitor, the network being adapted to operate between a resistive input impedance $R_1$ and a resistive output impedance $R_2$ and C, D, N, $R_1$, $R_2$, and $R_4$ being so chosen with respect to T and the amplification factor of the transistor that the network has a substantially constant amplitude characteristic and a substantially constant delay T at all frequencies below $N/2T$.

2. A delay network comprising an active network having an input terminal, an output terminal, and a ground terminal, the active network comprising a resistor, N capacitors each of value C, and a transistor having a base, a collector, and an emitter, the base being connected to the input terminal, the collector being connected to the output terminal, and the emitter being connected to the ground terminal through a path which includes the capacitors and switching means for connecting the capacitors into circuit sequentially and repetitively in a period of time T with a dwell time D for each capacitor, means for limiting the input signal to the active network to frequencies below $N/2T$, and means for limiting the output from the delay network to frequencies below $N/2T$, the resistor being connected between the base and the collector and having a value approximately equal to $D/2C$ and the delay network having a substantially constant delay time T at all frequencies below $N/2T$.

3. In combination, a source of electrical signals having a resistive impedance $R_1$, a resistive load $R_2$, and an interposed delay network comprising an input terminal, an output terminal, a ground terminal, a resistor of value $R_4$, N capacitors each of value C, and a transistor having a base, a collector, and an emitter, the base being connected to the input terminal, the collector being connected to the output terminal, the emitter being connected to the ground terminal through a path which includes the capacitors and switching means for periodically connecting the capacitors into circuit one after another in a time T and with a dwell time D for each capacitor, the resistor $R_4$ being connected between the base and the collector, and $R_4$ having a value so chosen with respect to D and C and $R_2$ having a value so chosen with respect to $R_1$ and $R_4$ that the network has a substantially constant delay time T at all frequencies below $N/2T$ and an approximately constant amplitude factor.

4. In combination, an input low-pass filter with a resistive output impedance $R_1$, an output low-pass filter with a resistive input impedance $R_2$, and an interposed active delay network comprising an input terminal, an output terminal, a ground terminal, a resistor of value $R_4$, N capacitors each of value C, and a transistor having a base, a collector, and an emitter, the base being connected to the input terminal, the collector being connected to the output terminal, and the emitter being connected to the ground terminal through a path which includes the capacitors and switching means for repetitively connecting the capacitors into circuit one after another in a time T with a dwell time D on each capacitor, the resistor $R_4$ being connected between the base and the collector and having a value approximately equal to $D/2C$, each of the filters having a cut-off at approximately $N/2T$, and $R_2$ having approximately the value $$R_2=R_4\left[\frac{R_1+R_4}{R_1-R_4}\right]$$

References Cited by the Examiner

UNITED STATES PATENTS

| | | | |
|---|---|---|---|
| 1,851,092 | 3/32 | Fetter | 333—29 |
| 2,622,213 | 12/52 | Harris | 307—88.5 |
| 2,900,533 | 8/59 | Hower | 307—88.5 |
| 2,947,881 | 8/60 | Elliott | 307—88.5 |
| 2,954,487 | 9/60 | Ostendorf | 307—88.5 |
| 2,966,641 | 12/60 | McCoy | 333—29 |
| 2,981,892 | 4/61 | Franks et al. | 333—29 |

FOREIGN PATENTS

| | | |
|---|---|---|
| 950,760 | 3/49 | France. |

HERMAN KARL SAALBACH, *Primary Examiner.*

BENNETT G. MILLER, *Examiner.*